United States Patent
Streicher et al.

(10) Patent No.: US 7,606,362 B1
(45) Date of Patent: Oct. 20, 2009

(54) FPGA CONFIGURATION BITSTREAM ENCRYPTION USING MODIFIED KEY

(75) Inventors: Keone Streicher, San Ramon, CA (US);
David Jefferson, Morgan Hill, CA (US);
Juju Joyce, Sunnyvale, CA (US);
Martin Langhammer, Wiltshire (GB)

(73) Assignee: Altera Corporation, San Jose, CA (US)

( * ) Notice: Subject to any disclaimer, the term of this patent is extended or adjusted under 35 U.S.C. 154(b) by 705 days.

(21) Appl. No.: 11/042,019

(22) Filed: Jan. 25, 2005

(51) Int. Cl.
*H04L 21/00* (2006.01)
(52) U.S. Cl. ........................................ 380/29
(58) Field of Classification Search .................... 380/29
See application file for complete search history.

(56) References Cited

U.S. PATENT DOCUMENTS

| | | | |
|---|---|---|---|
| 4,598,170 | A | 7/1986 | Piosenka et al. |
| 4,812,675 | A | 3/1989 | Goetting |
| 6,212,639 | B1 | 4/2001 | Erickson et al. |
| 6,996,713 | B1 | 2/2006 | Trimberger |
| 7,028,191 | B2 | 4/2006 | Michener et al. |
| 7,197,647 | B1 | 3/2007 | Van Essen et al. |
| 7,299,203 | B1 * | 11/2007 | Nelson .......................... 705/28 |
| 7,325,141 | B2 | 1/2008 | Chow et al. |
| 2002/0114455 | A1 * | 8/2002 | Asahi et al. .................. 380/201 |
| 2002/0199110 | A1 | 12/2002 | Kean |
| 2004/0186991 | A1 | 9/2004 | Kobayashi et al. |
| 2005/0113070 | A1 * | 5/2005 | Okabe ........................ 455/411 |
| 2005/0289355 | A1 | 12/2005 | Kitariev et al. |

OTHER PUBLICATIONS

Office Action from U.S. Appl. No. 11/042,032 dated Jul. 2, 2008.
Office Action from U.S. Appl. No. 11/435,416 dated Sep. 19, 2007.
Office Action from U.S. Appl. No. 11/435,416 dated Mar. 26, 2008.
Hoflich, Wolfgang; "Using the XC4000 Readback Capability"; *Xilinx XAPP 015.000*, http://xgoogle.xilinx.com/search?q=XAPP%20015.000&spell=1&filter=0&access=p&output=xml_no_dtd&ie=UTF-8&client=xilinx&site=EntireSite&oe=UTF-8&proxystylesheet=xilinx, pp. 8-37 thru 8-44, downloaded on Mar. 6, 2006.
Office Action from U.S. Appl. No. 11/042,019 dated Oct. 21, 2008.
Office Action from U.S. Appl. No. 11/042,937 dated Nov. 28, 2008.

\* cited by examiner

*Primary Examiner*—Andrew L Nalven
(74) *Attorney, Agent, or Firm*—Townsend and Townsend and Crew LLP

(57) ABSTRACT

Circuits, methods, and apparatus that prevent detection and erasure of a configuration bitstream or other data for an FPGA or other device. An exemplary embodiment of the present invention masks a user key in order to prevent its detection. In a specific embodiment, the user key is masked by software that performs a function on it a first number of times. The result is used to encrypt a configuration bitstream. The user key is also provided to an FPGA or other device, where the function is performed a second number of times and the result stored. When the device is configured, the result is retrieved, the function is performed on it the first number of times less the second number of times and then it is used to decrypt the configuration bitstream. A further embodiment uses a one-time programmable fuse (OTP) array to prevent erasure or modification.

20 Claims, 13 Drawing Sheets

FPGA CONFIGURATION BITSTREAM ENCRYPTION USING MODIFIED KEY

BACKGROUND

The present invention relates to configuring field programmable gate arrays generally, and more particularly to protecting configuration bitstreams from detection or alteration.

Field programmable gate array devices are logic or mixed signal devices that may be configured to provide a user-defined function. FPGAs are typically configured by receiving data from a configuration device. This data may be referred to as a configuration bitstream or program object file (POF). This bitstream opens and closes switches formed on an FPGA such that desired electrical connections are made.

Modern FPGAs contain hundreds of thousands of logic gates, as well as processors, memories, dedicated analog function blocks, and other circuits. This extensive circuitry requires a correspondingly long configuration bitstream to configure it. For example, 55 Megabits of configuration data are now needed by some FPGAs.

This configuration data represents an FPGA user design that is the outcome of a huge investment in manpower and research and development costs, often in the million dollar range. To protect this investment, configuration bitstreams are often encrypted. The encrypted bitstream is decrypted using a key stored on the FPGA, and the FPGA is then configured. When the FPGA is configured by a configuration device, the bitstream that is susceptible to detection is encrypted and thus protected.

Unfortunately, at least three problems remain even with encryption. First, if the encryption key can be determined, for example by examining an FPGA, the encrypted bitstream can be copied and the protected device can be cloned. Second, if the key can be erased or modified, then the protected device can be reconfigured to perform a new function. This can be particularly problematic if the device is performing an important function, such as a network security device. Third, if there is no validity check, a rogue encrypted bitstream could be used to configure an FPGA.

Thus, what is needed are circuits, methods, and apparatus that modify an encryption key such that the modified key used to encrypt a configuration bitstream cannot readily be determined. It is also desirable that embodiments further check the validity of an encrypted configuration bitstream.

SUMMARY

Accordingly, embodiments of the present invention provide circuits, methods, and apparatus that modify an encryption key for use in encrypting and decrypting a configuration bitstream. This modification helps prevent detection of the modified key. These modified encryption keys may be used to encrypt and decrypt a configuration bitstream for an FPGA or other programmable or configurable device, or it may be used on any device to prevent detection, modification, or erasure of configuration bitstreams or other types of information, for example, device serial numbers or other identifying or security information. Various embodiments of the present invention further check the validity of encrypted configuration bitstreams.

One embodiment of the present invention alters, masks, or modifies a first key to help prevent detection of both the first key and the modified key. Specifically, in software, a function is performed on the first key a first number of times and the result is used to encrypt a configuration bitstream. This function may include encryption such as encryption consistent with the Advanced Encryption Standard (AES), scrambling, exclusive-ORing with a second key or other pattern to generate a result. Alternately, other functions, which may be presently known or later developed, can be used to alter, mask, or modify the first key. The function is also implemented on an integrated circuit such as an FPGA. The function is performed a second number of times on the first key and the result is stored. This result may be stored in a non-volatile memory, such as a fuse or one-time-programmable fuse array. When the device is to be configured, the memory is read and the function is performed the first number of times less the second number, and the result is used to decrypt the configuration bitstream.

Since neither the first key nor the modified key are stored on the FPGA or other device, both the first key and modified key are protected from discovery. Even if the stored key is determined, since it is an modified version of the first key, the first key is protected. Further, if the stored key is determined, it is further modified before it can correctly decrypt a configuration bitstream, thus the modified key and encrypted bitstream are protected.

The value of the second number may be fixed on the integrated circuit or provided the integrated circuit at the same time as the first key is provided. The second number may be stored in a memory, for example, a non-volatile memory, such as a fuse or one-time-programmable fuse array.

In another embodiment, the first key is provided to the integrated circuit. A function is performed on it a first number of times. The result is used to configure a decode logic circuit. The first key is then provided to the integrated circuit a second time where it is decoded by the newly configured decoder circuit. The function is performed on the decoded first key a first number of times, and the result is again stored in memory. Upon configuration, the result is retrieved, the function performed a second number of times, and this result is used to decrypt an encrypted configuration bitstream. The first key is similarly decoded in the software that originally encrypts the bitstream such that the bitstream may be properly decrypted.

A further embodiment of the present invention provides circuits, methods, and apparatus that may be used to verify the validity of an encrypted configuration bitstream. An expected value is included in a non-encrypted header section of the bitstream. A function is performed on the encrypted configuration portion of the bitstream and a result generated. The result is compared to the expected value and validity is determined. Various embodiments of the present invention may incorporate one or more of these and the other features described herein.

A better understanding of the nature and advantages of the present invention may be gained with reference to the following detailed description and the accompanying drawings.

DESCRIPTION OF EXEMPLARY EMBODIMENTS

Figure 1:
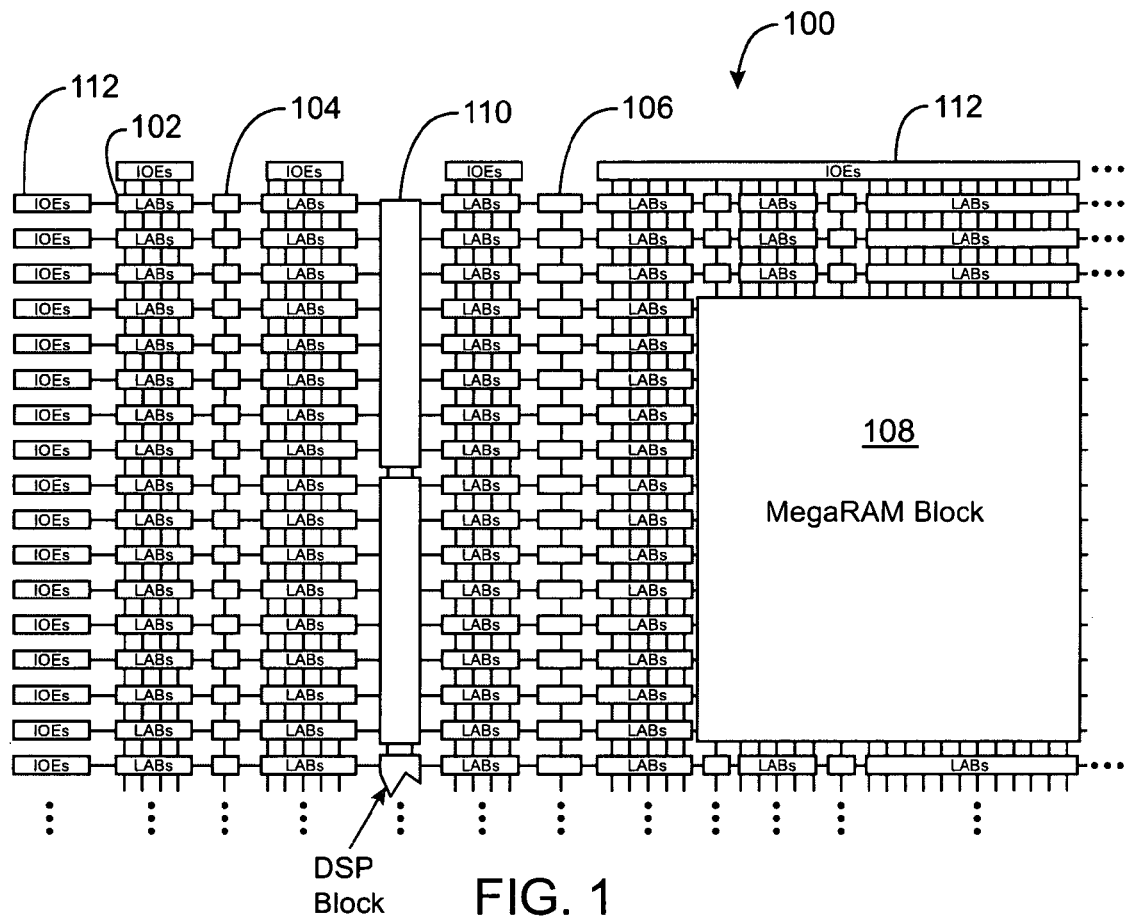
FIG. 1 is a simplified block diagram of a programmable logic device that may benefit by incorporating embodiments of the present invention.

FIG. 1 is a simplified partial block diagram of an exemplary high-density programmable logic device 100 wherein techniques according to the present invention can be utilized. PLD 100 includes a two-dimensional array of programmable logic array blocks (or LABs) 102 that are interconnected by a network of column and row interconnections of varying length and speed. LABs 102 include multiple (e.g., 10) logic elements (or LEs), an LE being a small unit of logic that provides for efficient implementation of user defined logic functions. PLD 100 also includes a distributed memory structure including RAM blocks of varying sizes provided throughout the array. The RAM blocks include, for example, 512 bit blocks 104, 4K blocks 106 and an M-Block 108 providing 512K bits of RAM. These memory blocks may also include shift registers and FIFO buffers. PLD 100 further includes digital signal processing (DSP) blocks 10 that can implement, for example, multipliers with add or subtract features.

It is to be understood that PLD 100 is described herein for illustrative purposes only and that the present invention can be implemented in many different types of PLDs, FPGAs; and the other types of digital integrated circuits.

Figure 2:
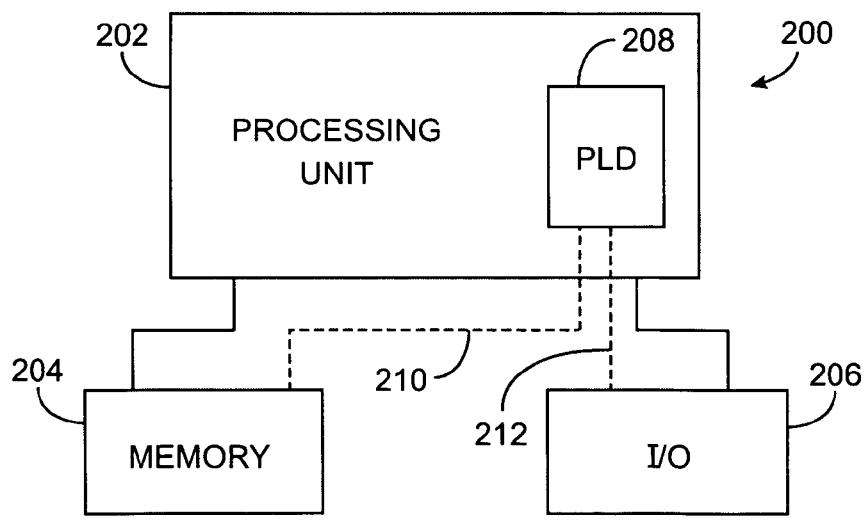
FIG. 2 is a block diagram of an electronic system that may benefit by incorporating embodiments of the present invention.

While PLDs of the type shown in FIG. 1 provide many of the resources required to implement system level solutions, the present invention can also benefit systems wherein a PLD is one of several components. FIG. 2 shows a block diagram of an exemplary digital system 200, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 200 may be provided on a single board, on multiple boards, or within multiple enclosures.

System 200 includes a processing unit 202, a memory unit 204 and an I/O unit 206 interconnected together by one or more buses. According to this exemplary embodiment, a programmable logic device (PLD) 208 is embedded in processing unit 202. PLD 208 may serve many different purposes within the system in FIG. 2. PLD 208 can, for example, be a logical building block of processing unit 202, supporting its internal and external operations. PLD 208 is programmed to implement the logical functions necessary to carry on its particular role in system operation. PLD 208 may be specially coupled to memory 204 through connection 210 and to I/O unit 206 through connection 212.

Processing unit 202 may direct data to an appropriate system component for processing or storage, execute a program stored in memory 204 or receive and transmit data via I/O unit 206, or other similar function. Processing unit 202 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 208 can control the logical operations of the system. In an embodiment, PLD 208 acts as a reconfigurable processor, which can be reprogrammed as needed to handle a particular computing task. Alternately, programmable logic device 208 may itself include an embedded microprocessor. Memory unit 204 may be a random access memory (RAM), read only memory (ROM), fixed or flexible disk media, PC Card flash disk memory, tape, or any other storage means, or any combination of these storage means.

Figure 3:
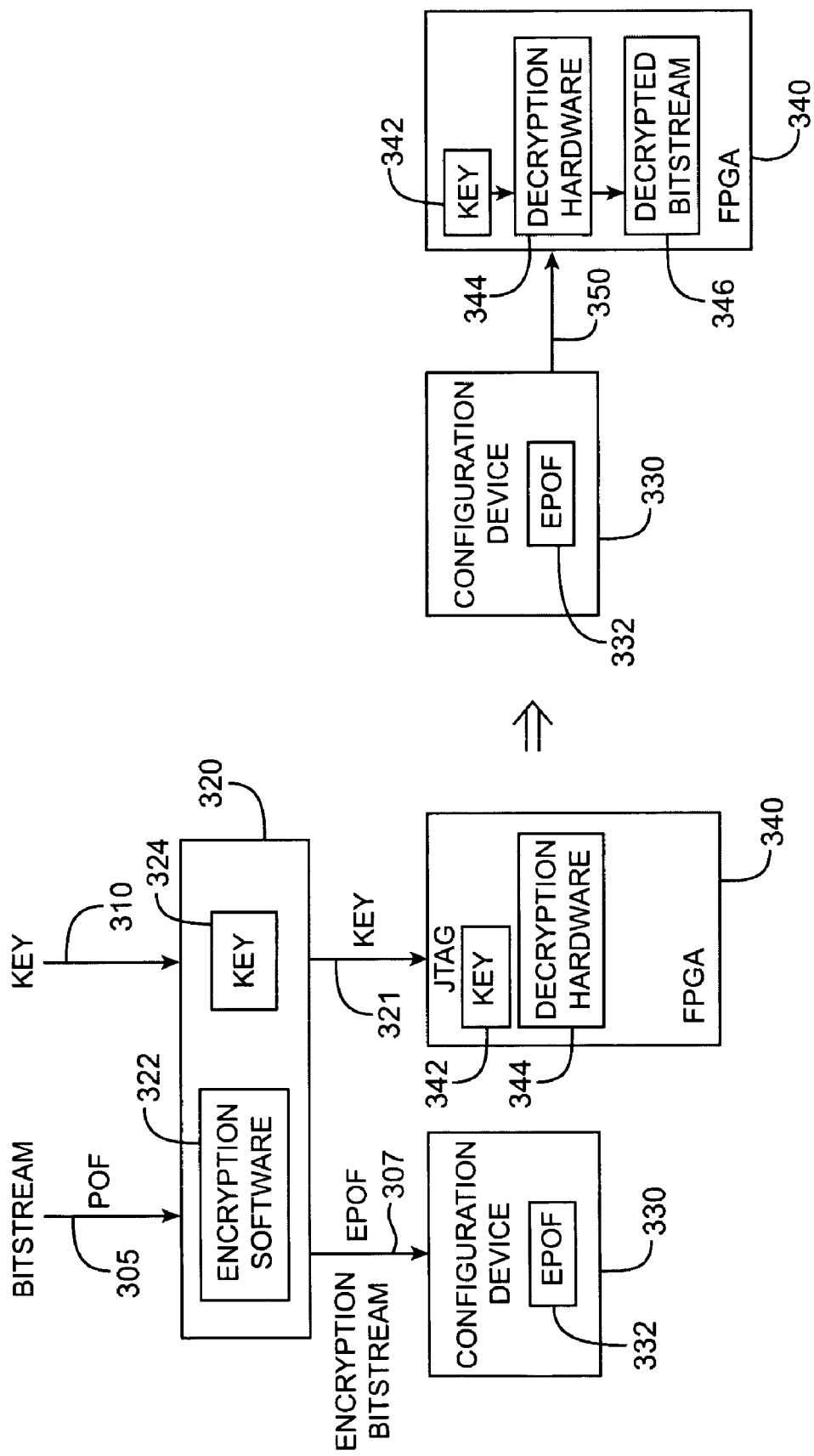
FIGS. 3A and 3B illustrate circuits and software that may benefit by incorporating embodiments of the present invention.

FIGS. 3A and 3B illustrate circuits and software that may be improved by incorporating embodiments of the present invention. These circuits and software may be used to provide encrypted configuration information to field programmable gate arrays. Specifically, FIG. 3A illustrates the loading of an encrypted bitstream into a configuration device and a key into a field programmable gate array, while FIG. 3B illustrates the loading of the encrypted bitstream from the configuration device to the FPGA.

FIG. 3A includes a software package 320 that further includes encryption software 322 and key storage and handling software 324, a configuration device for storing an encrypted bitstream 332, and a field programmable gate array including storage locations for key storage 342 and decryption hardware 344. A bitstream is loaded into the encryption software routine 322 via software interface 305. The encryption software encrypts the bitstream and provides an encrypted bitstream through interface 307 to the configuration device 330, where it is stored as an encrypted bitstream 332. Similarly, a key is provided by a user over interface 310 to key handling software 324 which provides the key over interface 321 to the FPGA 340. The key is stored in locations 342 for use by the decryption hardware 344.

FIG. 3B includes a configuration device that further includes encrypted bitstream 332, and a field program gate array 340 including key storage 342 decryption hardware 344 and a decrypted bitstream 346. At power up, during a fault condition, or other appropriate time, the encrypted bitstream 332 is provided by the configuration device 330 over interface 350 to the decryption hardware 344 in the field programmable gate array 340. The decryption hardware 344 also receives the key 342 stored on the field programmable gate array 340 and provides a decrypted bitstream 346. The decrypted bitstream 346 is then used to configure the FPGA such that it provides the desired logic function.

In typical applications, the activities illustrated in FIG. 3A occur either at a location (for example, their factory) under control of the field programmable gate array manufacturer (vendor) or purchaser, while the activities illustrated in FIG.

3B occur once the field programmable gate array is incorporated in an end product. Accordingly, since only the encrypted bitstream is available for detection over interface 350 in FIG. 3B, the original un-encrypted bitstream is protected from discovery.

Figure 4:
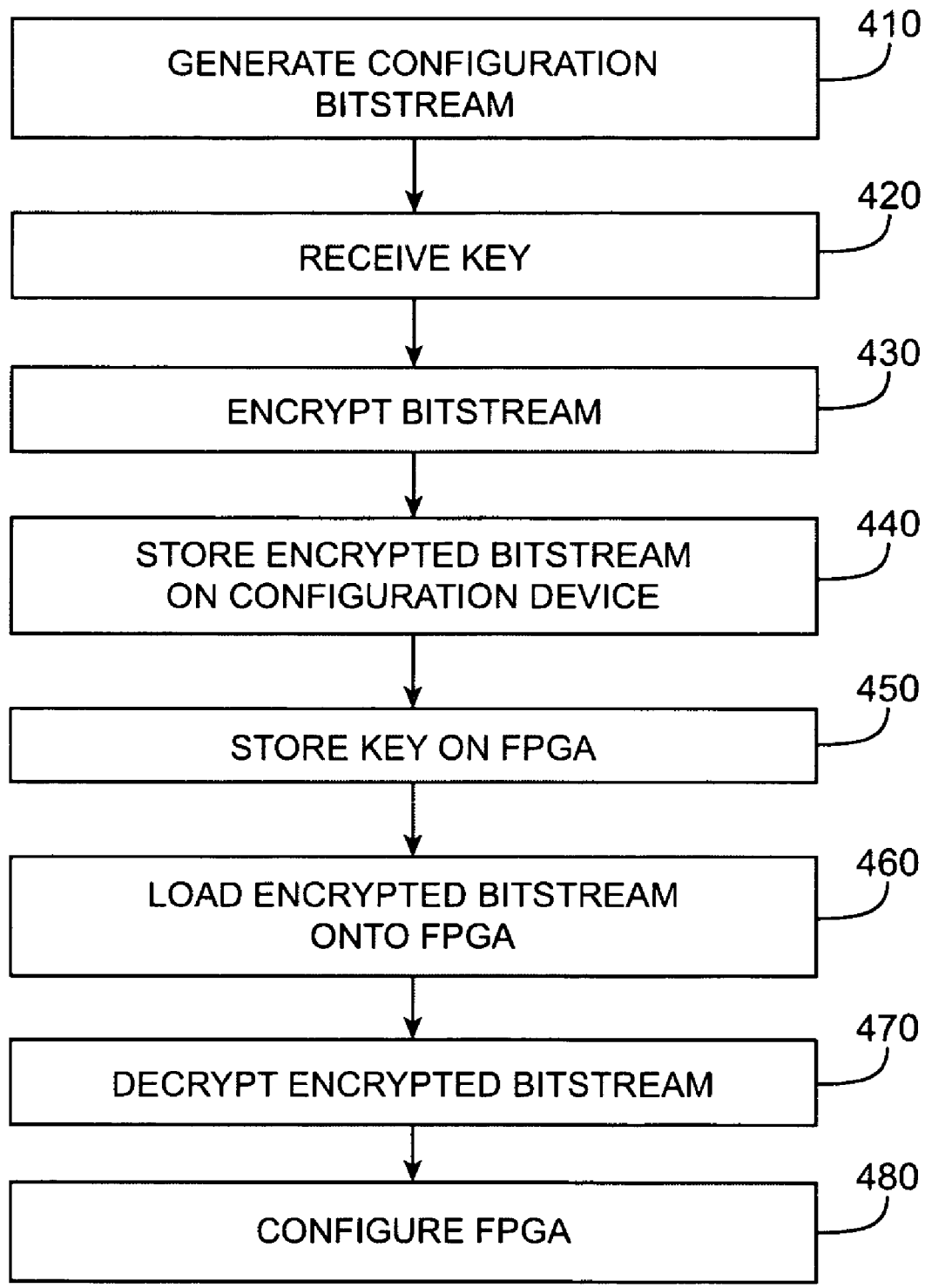
FIG. 4 illustrates a method of configuring a field programmable gate array that may be improved by incorporating embodiments of the present invention.

FIG. 4 illustrates a method of configuring a field programmable gate array that may be improved by incorporating embodiments of the present invention. In act 410, a configuration bitstream is generated. The configuration bitstream may be generated using design software such as VHDL (Very High Speed Integrated Circuit Hardware Description Language) or Verilog. In act 420, an encryption key is received, for example from a user, database, look-up table or other source. Alternately, the software program may generate its own key, or suggest a key to the user. In act 430, the key is used to encrypt the configuration bitstream, and in act 440, the encrypted bitstream is stored on a configuration device. This configuration device may be a flash memory or other non-volatile memory device, such as a memory with a self-contained battery backup. The configuration device may be an integrated circuit, compact flash card, or other device. In act 450, the key is stored on a field programmable gate array or other programmable or configurable device. The acts to this point are typically performed at a location under the control of the field programmable gate array vendor or purchaser such as an original equipment manufacturer (OEM).

The following acts typically occur at power up, after a fault or error condition, or at other appropriate times while the FPGA is in use in an electrical system. In act 460, the encrypted bitstream is loaded from the configuration device to the field programmable gate array. In act 470, the encrypted bitstream is decrypted in the FPGA and used to configure the FPGA in act 480. This configuration act configures the FPGA such that it performs the desired function.

Figure 5:
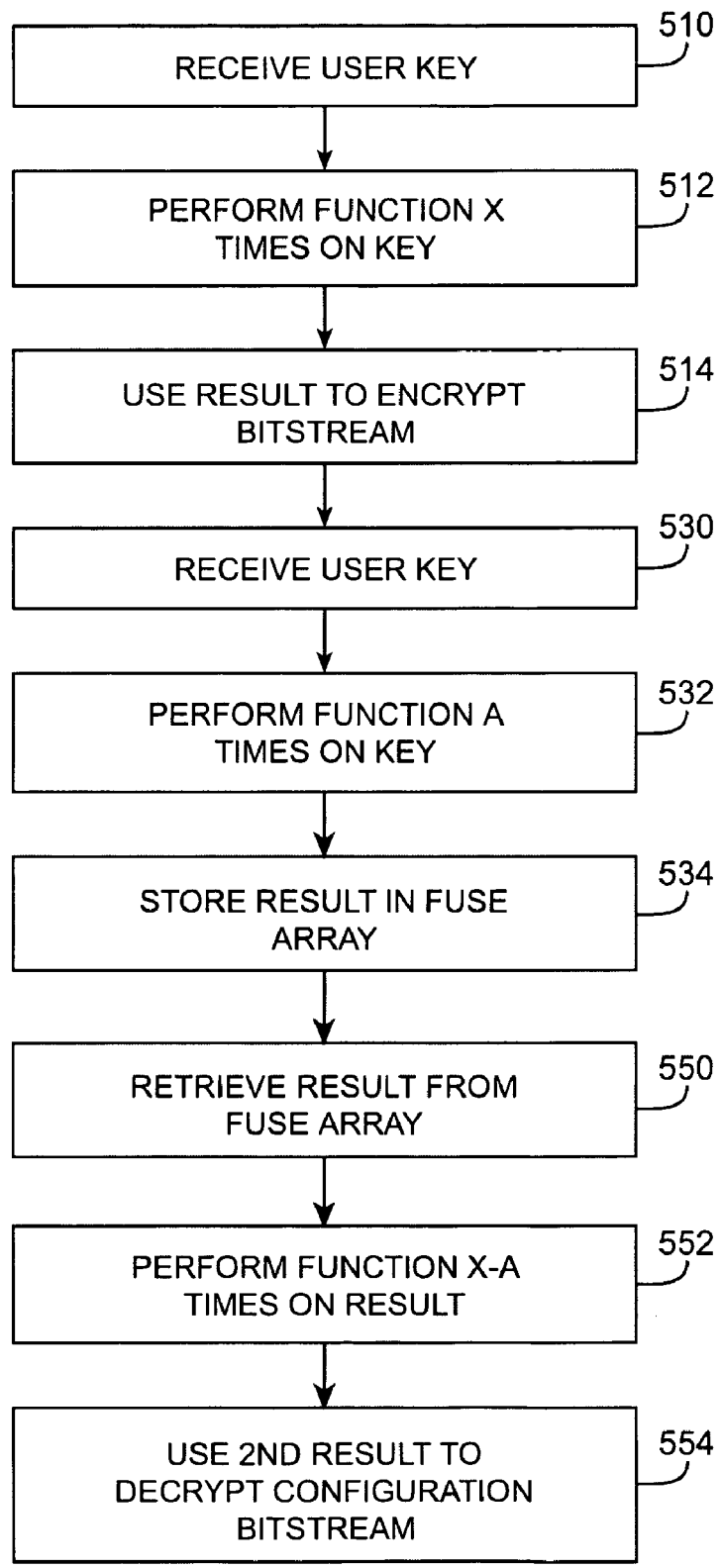
FIG. 5 illustrates a flow chart of a method of encrypting and decrypting a configuration bitstream according to an embodiment of the present invention.

FIG. 5 illustrates a flow chart of a method of encrypting and decrypting a configuration bitstream according to an embodiment of the present invention. The first to the three acts listed typically occur in software. These acts may occur at a system manufacturer location. Alternately, these may occur remotely, for example over the Internet. In act 510, a user key is received. This user key may be provided by a system designer, and may be provided by software, from a lookup table, or other appropriate source. In act 512, a function is performed "X" number of times on this key. This function may for example be AES encryption. Alternatively it may be another function, such as scrambling. In act 514, the results are used to encrypt a configuration bitstream. The encrypted bitstream may then be stored in a memory, for example on a configuration device.

The following three acts typically occur on an integrated circuit such as an FPGA or other configurable device. These acts may occur at a system manufacturer's location, or remotely, for example, over the Internet or phone lines. In act 530, the user key is received. In a specific embodiment, the user key is received via a JTAG port. In act 532, the function is performed "A" times on this key, and the result is stored, for example, on the integrated circuit, in act 534. In a specific embodiment, the result is stored in a fuse array, though other nonvolatile type memories may be used. Alternately, volatile memories may be used.

The final three acts typically occur at device power up. At this time, the device is typically in a system. In act 530, the stored key is retrieved from the memory or fuse array. In act 552, the function is performed on the retrieved key "X-A" number of times. This result is then used to decrypted the encrypted configuration bitstream.

In this particular example, a function is performed "X" times on the key in software and "X" times on the integrated circuit such that the same modified key is generated for use in encryption and decryption. In other embodiments, more than one of function may be used to modify the key. For example, a first function may be used a first number of times, while a second function may be used a second number of times. So long as the same functions are used in both software and hardware, the same modified key is generated and used to the first to encrypt the key in software and then decrypted the configuration bitstream on the configurable device.

Figure 6:
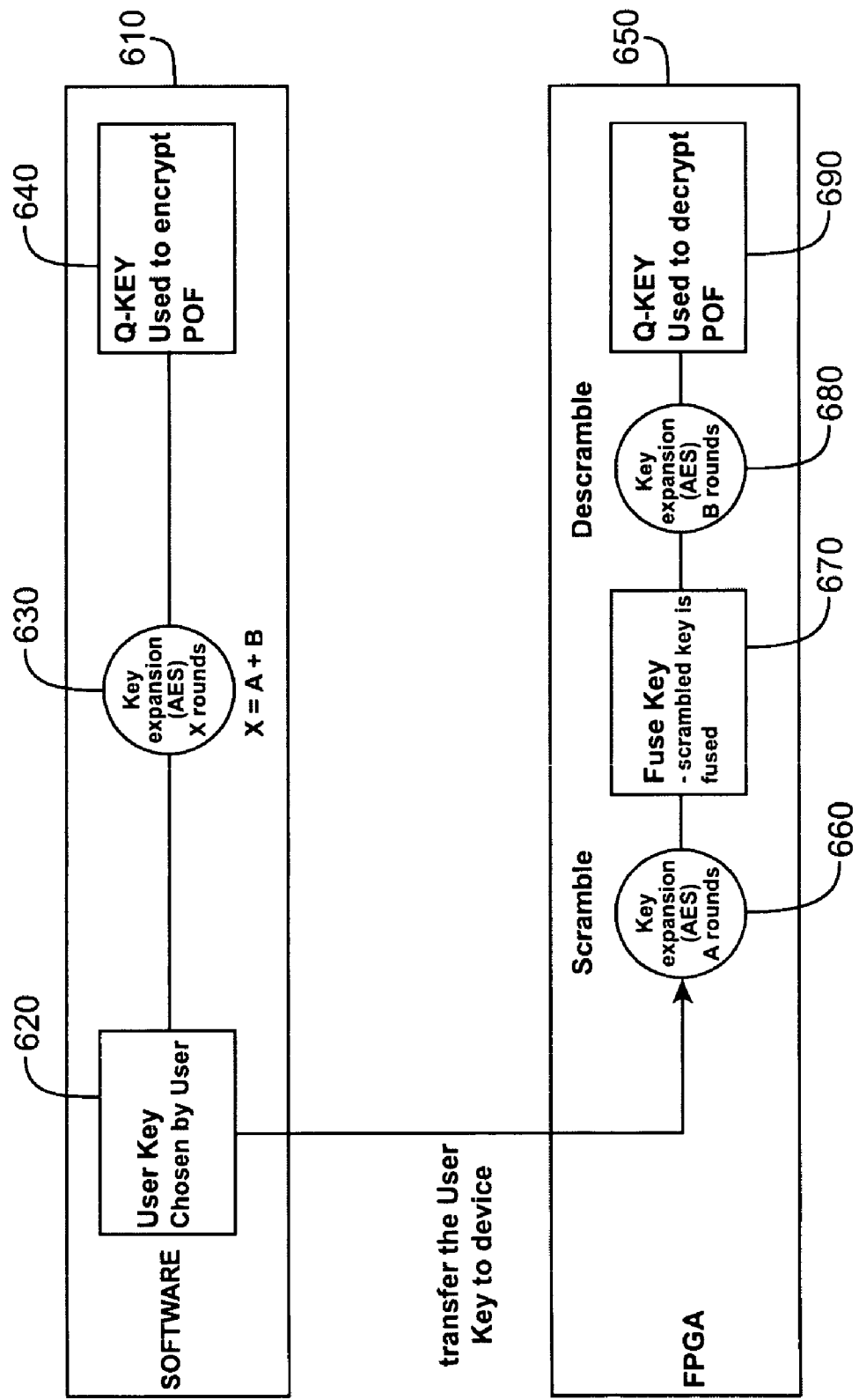
FIG. 6 illustrates circuits and software that incorporate an embodiment of the present invention.

FIG. 6 illustrates circuits and software that incorporate an embodiment of the present invention. This figure includes acts that are performed in software 610 and on an FPGA or other integrated circuit 650. Again, a user key 620 is provided. This user key may be chosen by the user as indicated, or it may be provided by software, lookup tables, or other appropriate sources. The key is operated on by a function 630. In this example, a key expansion consistent with the AES standard is run for "X" rounds. In other embodiments, other functions may be used, for example, other encryption standards or methods of scrambling and may be used. In 640, the modified key, the resulting Q-key is available and used to encrypt the configuration bitstream. As before, the result may be stored in a memory, such as a configuration device.

The user key is provided to the FPGA where it is operated on a number of times 660. Again, in this particular example, "A" rounds of AES key expansion are performed. The result is stored in a memory, such as a fuse or one-time programmable fuse array 670. Upon power up, or whenever the device is to be configured, the result is retrieved from the memory 670 and undergoes "B" more rounds of key expansion, where B=X−A. The result is the modified or Q-key, which may be used to decrypted the configuration bitstream.

In this particular example, two circuits 660 and 680 are implied for the key expansion. In practical circuits, one AES circuit is used for both functions. Moreover, this AES circuit may be used as part of a message authentication circuit, as discussed below.

In this example, the values of "A" and "B" are predetermined and designed or programmed as part of the device. Alternatively, one or both of these values may be provided from an external source.

In this example, neither the user key 620 nor the modified or Q-Key 690 are stored on the FPGA 650. Accordingly, even if the key fused in memory 670 is determined, the user key 620 cannot be determined. Further, since the stored key is further encrypted to form the Q-Key 690, the modified or Q-Key 690 is also protected from discovery. Thus, even an attacker who determines the identity of the fused key 670 cannot easily determine the contents of an encrypted configuration bitstream.

Figure 7:
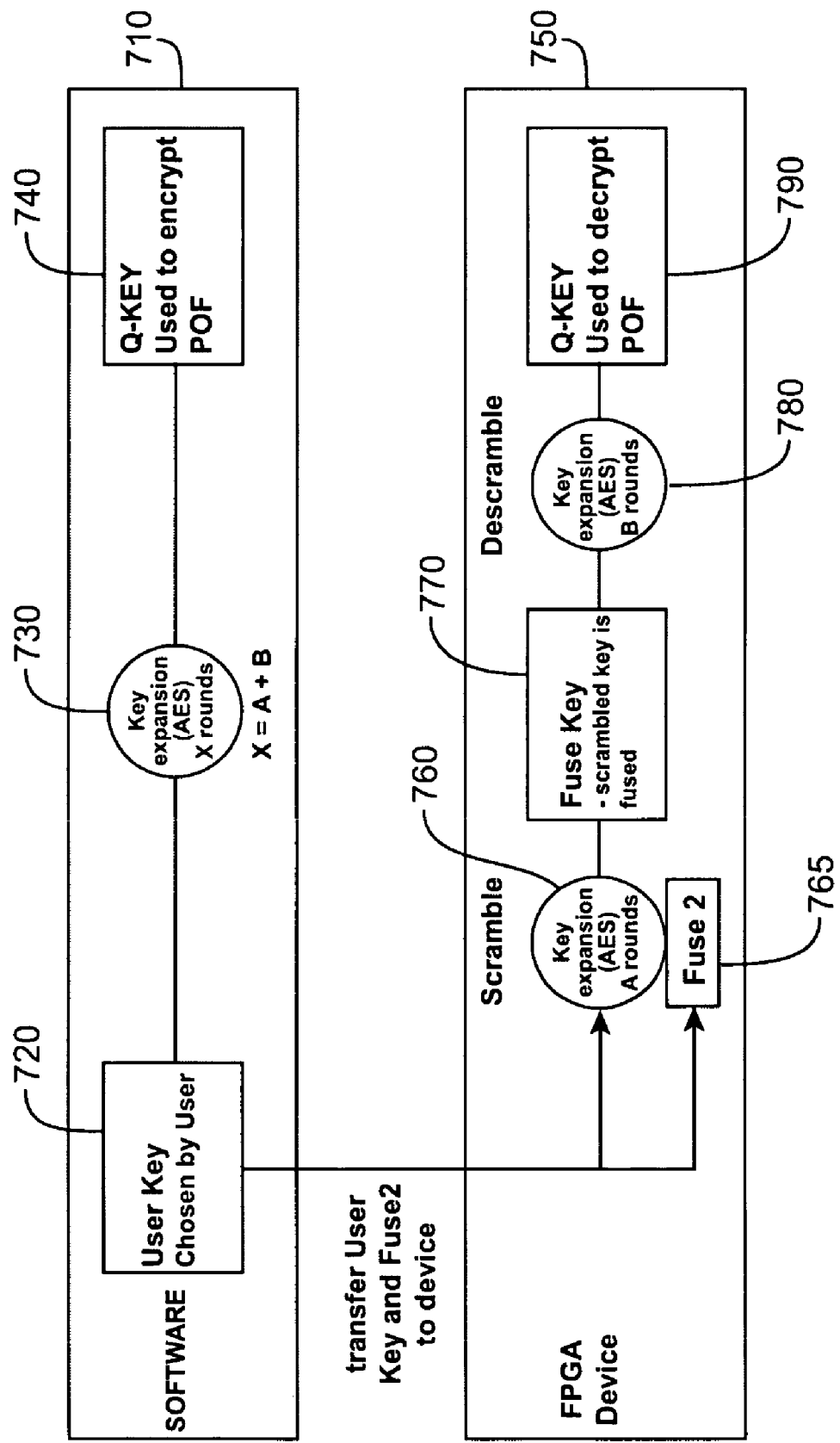
FIG. 7 illustrates further circuits and software that incorporate an embodiment of the present invention.

FIG. 7 illustrates further circuits and software that incorporate an embodiment of the present invention. In this example, the value of "A" is provided with the user key 720 to the FPGA or other device 750 by the software 710. In other embodiments, the value of A may come from another source. The value of a may be programmed into a second fuse array 765. In other embodiments, the value of "A" is not permanently stored, but is used on the integrated circuit 750 until the scrambled key is stored in the memory 770.

Figure 8A:
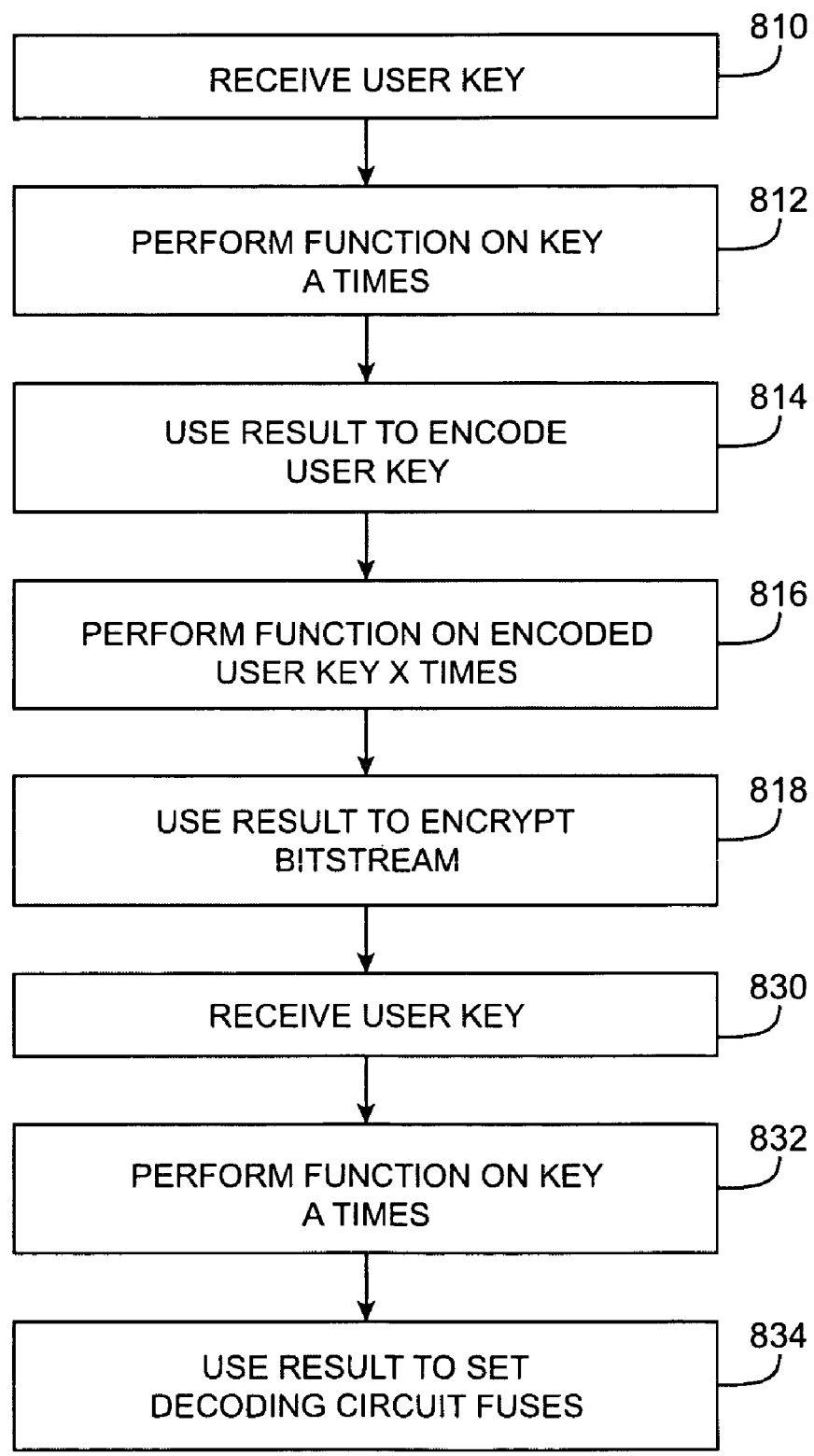
FIGS. 8A and 8B illustrates a flowchart of a method of encrypting and decrypting a configuration bitstream according to an embodiment of the present invention.
Figure 8B:
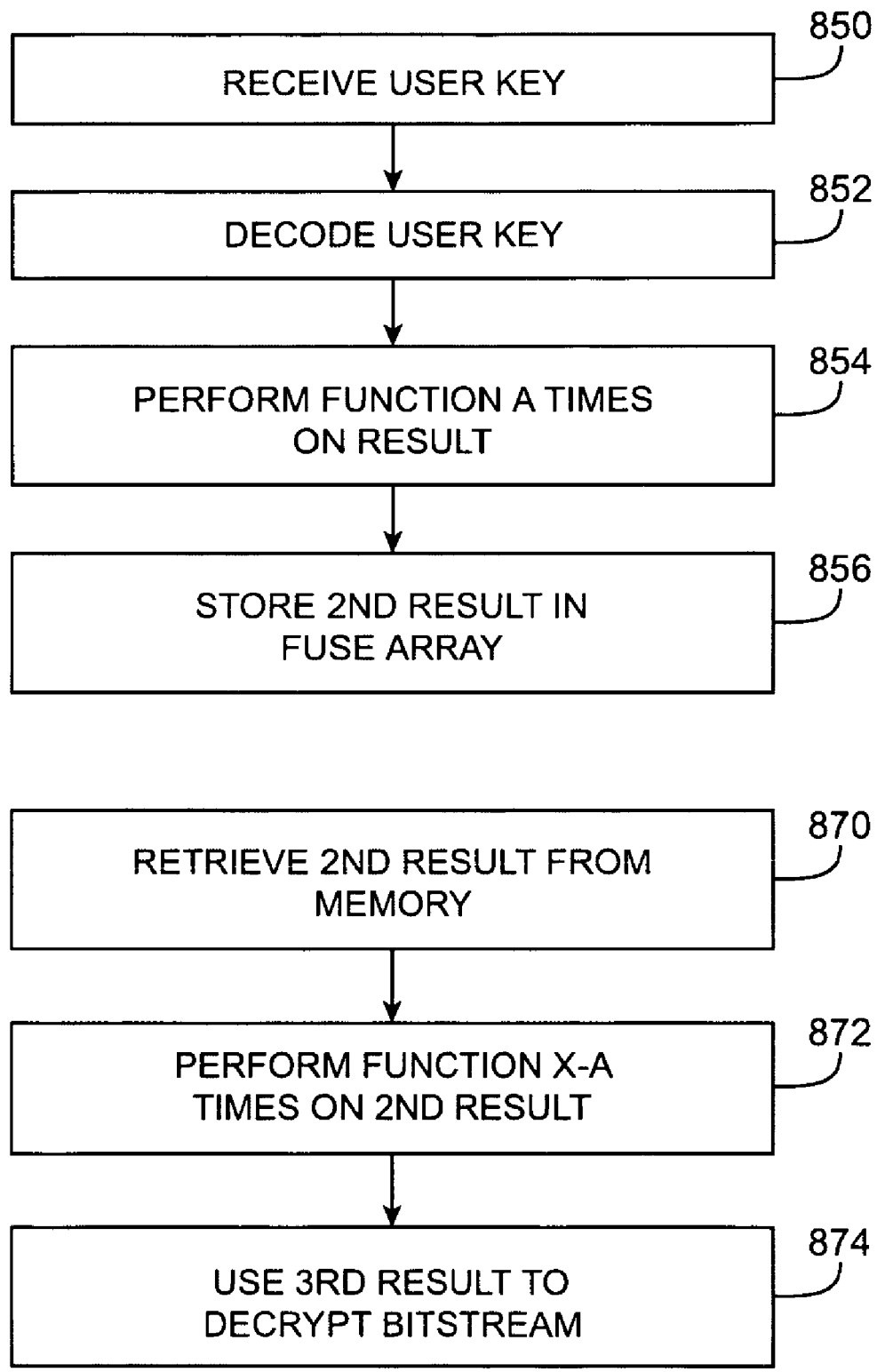

FIGS. 8A and 8B illustrates a flowchart of a method of encrypting and decrypting a configuration bitstream according to an embodiment of the present invention. In this example, the first five acts are performed in software. These acts may occur at a system manufacturer's location, or remotely, for example, via the Internet. In act 810, a user key is received. As before, this user key may be provided by a user, software, lookup table, or other appropriate source. In act 812, a function is performed on the key "A" number of times. In act 814, this result is used to encode the user key. To the user key is encoded and the function is performed on the encoded user key "X" times in act 816. In act 818, the result is used to encrypt a configuration bitstream, or other data pattern needing protection.

The following three acts are performed on an FPGA or other integrated circuit. In act 830, the user key is received. The function is performed "A" times on the key in act 832, and the result, or a portion of the result, is stored on the integrated circuit in act 834. For example, the result or a portion of the result may be used to program fuses in a fuse array or one-time programmable fuse array, or other nonvolatile or volatile memory.

In FIG. 8B, the first four acts are also performed on the integrated circuit. Again these acts may be performed at the system manufacturer's location before the integrated circuit is deployed. In act 850, the user key is once again received by the configurable or other integrated circuit. In act 852, the user key is encoded using encoder circuits under the control of the results generated in act 832. In act 854, the function is performed "A" times on this result. This new, second result is stored as a scrambled key in memory, again such as a fuse array.

At power up or other configuration time, the scrambled key is retrieved from memory, in act 870. The function is performed "X-A" times to generate a key to may be used to decrypt the bitstream in act 874.

Figure 9:
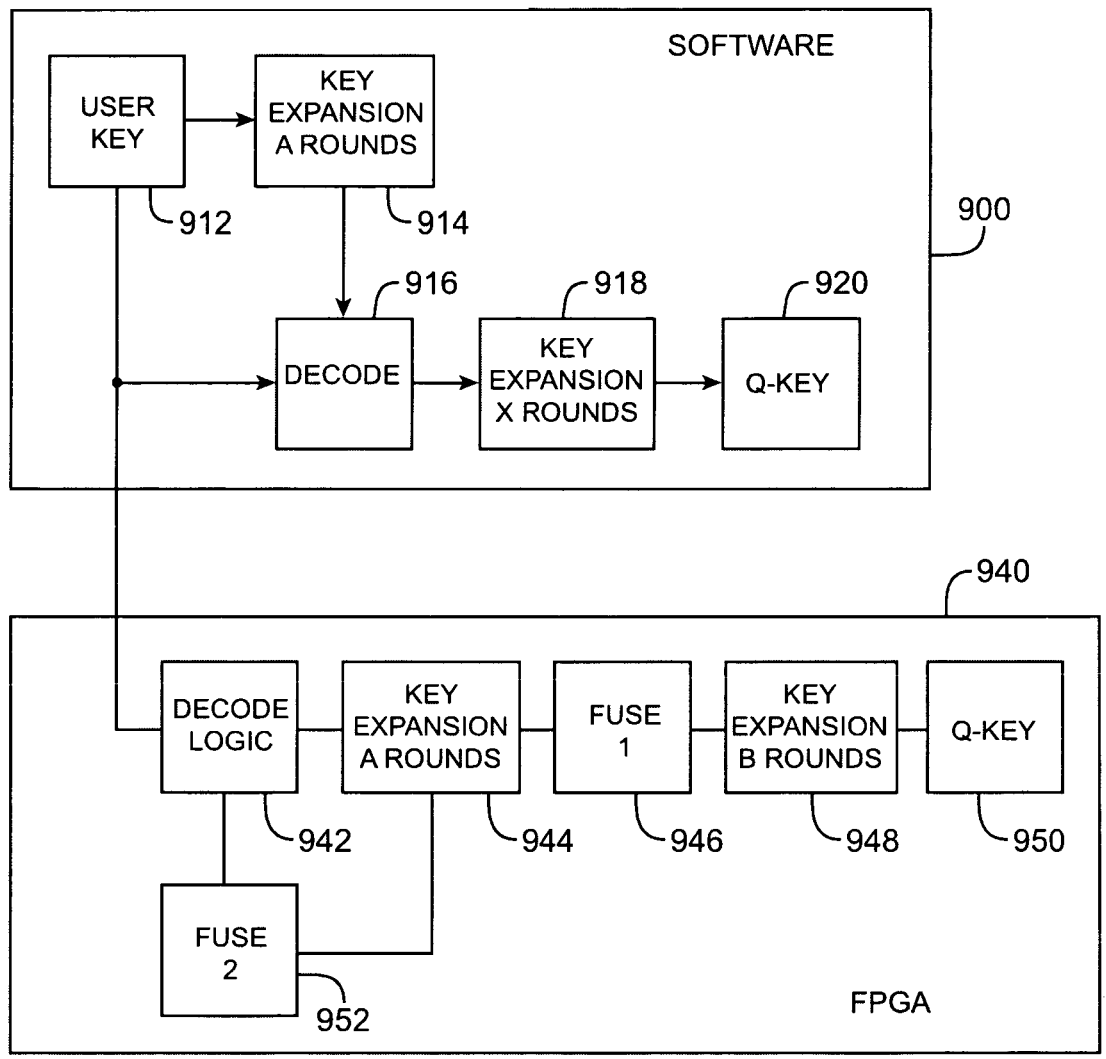
FIG. 9 illustrates further circuits and software that incorporate an embodiment of the present invention.

FIG. 9 illustrates further circuits and software that incorporate an embodiment of the present invention. This figure includes software 900 and a configurable device such as a FPGA or other integrated circuit 940. A user key 912 undergoes "A" rounds of key expansion 914 and is used to configure an encoder 916. The user key is encoded and the results undergo "X" rounds of key expansion 918. The result is a Q-Key 920 in software that may be used to encrypt a configuration bitstream. Again, this encrypted configuration bitstream may be stored in a memory such as a configuration device.

The user key is also provided to the FPGA 940. Decode logic 942 initially does not transform the user key 912. The user key undergoes "A" rounds of key expansion 944. The result, a portion of the result, or an encoded version is stored in a volatile or nonvolatile memory 952, again such as a fuse array.

The user key 912 is again provided to the FPGA 940, where it is encoded by encoder logic 942. The result undergoes "A" rounds of key expansion 944, and the result is stored in a volatile or nonvolatile memory 946.

At power up, or when the device is to be configured, the scrambled key is retrieved from memory 946, were it undergoes "B" rounds of key expansion 948 where B=X−A. The result is the modified or Q-Key 950, which may be used to decrypt a configuration bitstream received from memory or configuration device.

Figure 10:
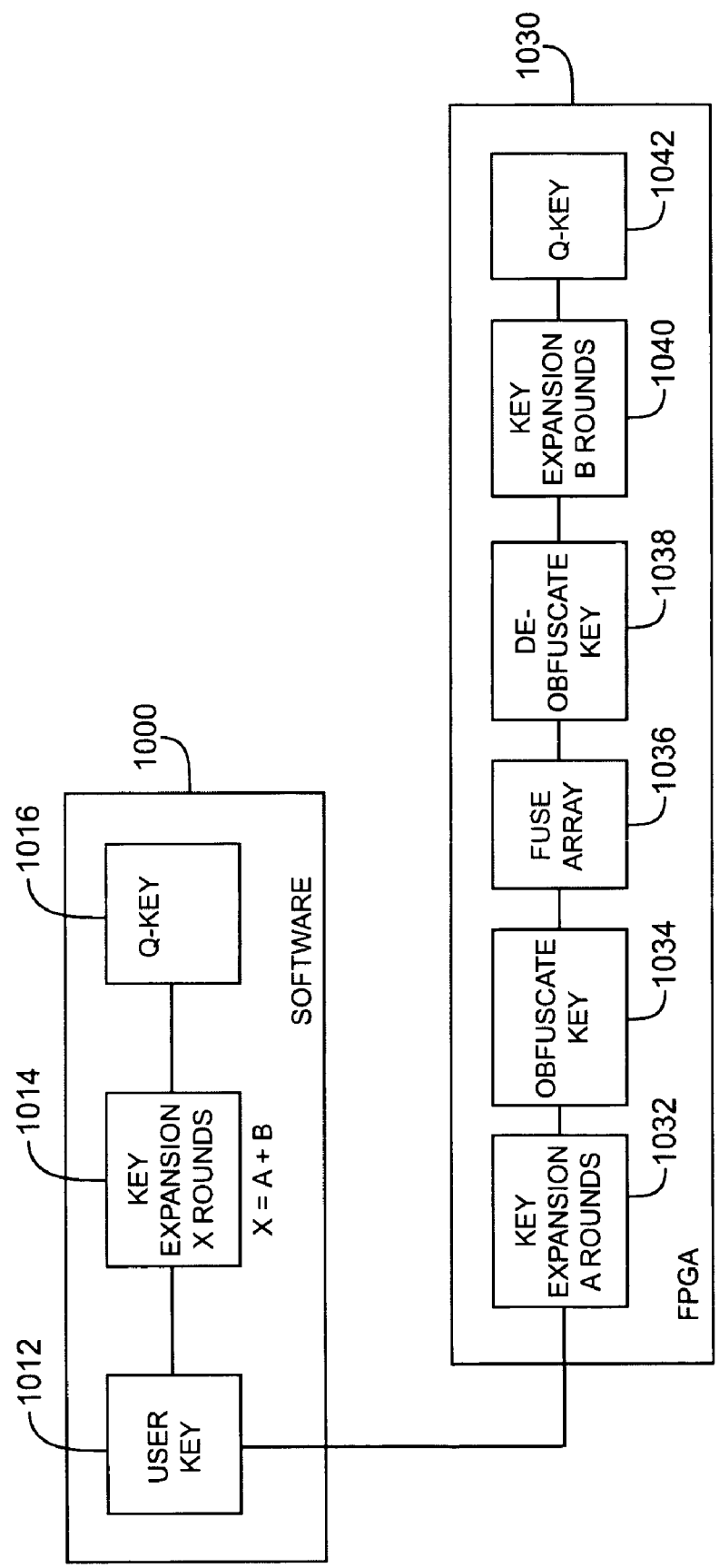
FIG. 10 illustrates further circuits and software that further obfuscate a stored key in accordance with an embodiment of the present invention.

FIG. 10 illustrates further circuits and software that obfuscate a stored key in accordance with an embodiment of the present invention. This figure includes software 1000 and a configurable integrated circuit such as an FPGA, or other type of integrated circuit 1030. The user key 1012 undergoes "X" rounds of key expansion 1014, resulting in a modified or Q-Key 1016 that may be used to encrypt a configuration bitstream.

The user key 1012 is provided to the integrated circuit 1030, were it undergoes "A" rounds of key expansion 1032.

The key is obfuscated by obfuscation circuits 1034, and the obfuscated key is stored in a memory such as a fuse array 1036.

At power up, the obfuscated key is retrieved, and de-obfuscated by circuit 1038. This result undergoes "B" rounds of key expansion 1040, where B=X−A, resulting in the modified or Q-Key 1042. The modified or Q-Key 1042 may be used to decrypt an encrypted configuration bitstream.

If the key is ever determined, a new configuration bitstream could be encrypted using this key, and the device preprogrammed to perform a new function. This could be particularly undesirable, for example, if the integrated circuit was operating as a network security device. Accordingly, it is desirable to have a method of authenticating a configuration bitstream, that is, it is desirable to have a method of verifying the validity of a configuration bitstream.

Figure 11:
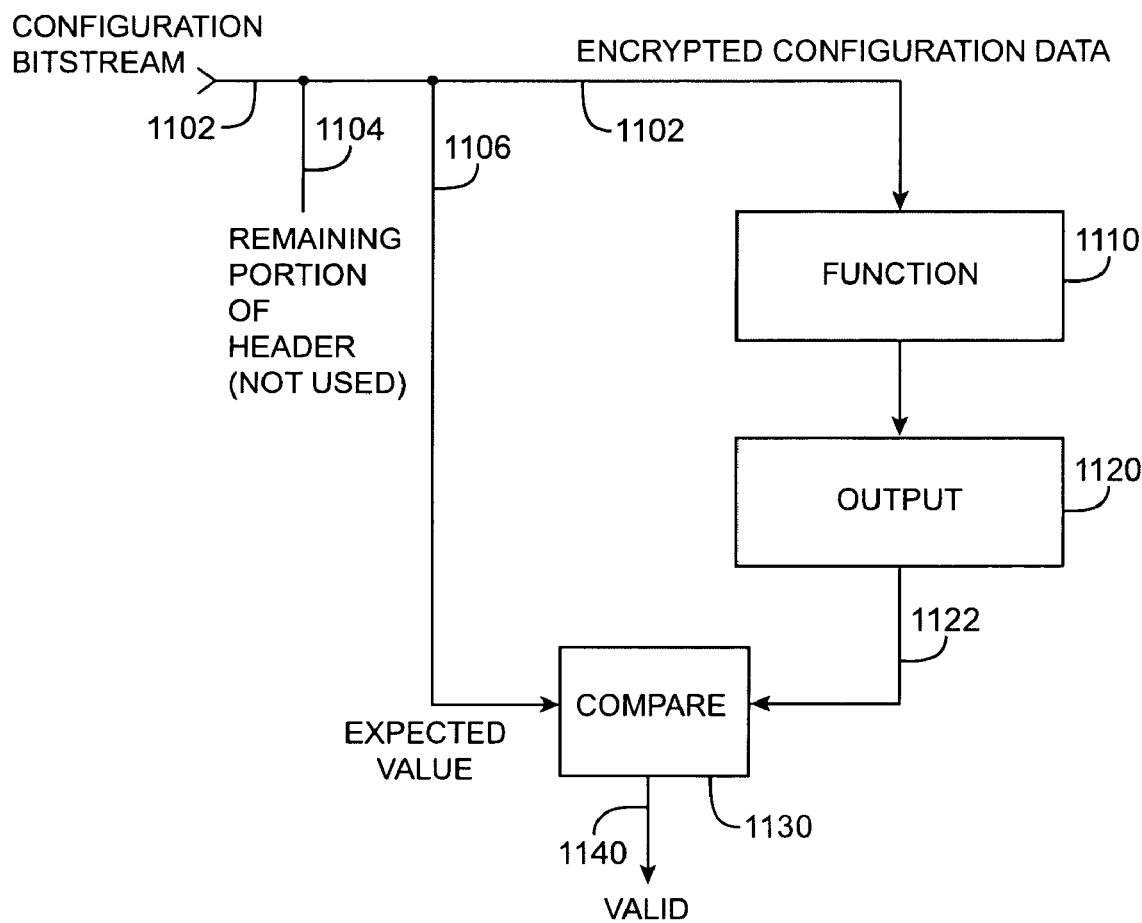
FIG. 11 illustrates a method of verifying a configuration bitstream according to an embodiment of the present invention.

FIG. 11 illustrates a method of verifying a configuration bitstream according to an embodiment of the present invention. This configuration bitstream includes a header portion and configuration data. The configuration data is encrypted, while the header portion is not encrypted. Under some circumstances, portions of the header may be well-known, or able to be determined. If the header were encoded, this information could lead to discovery of the modified key. Accordingly, the header is not encrypted. The header portion includes an expected value 1106 and a remainder 1104. In this example, the portion of the header that is not the expected value 1106 is not used.

The encrypted configuration data is received by a function block 1110, which performs a function on it. The output 1120 is provided to a comparison circuit 1130. The comparison circuit compares the expected value 1106 to the output on line 1122 and makes a determination of validity 1140.

Figure 12:
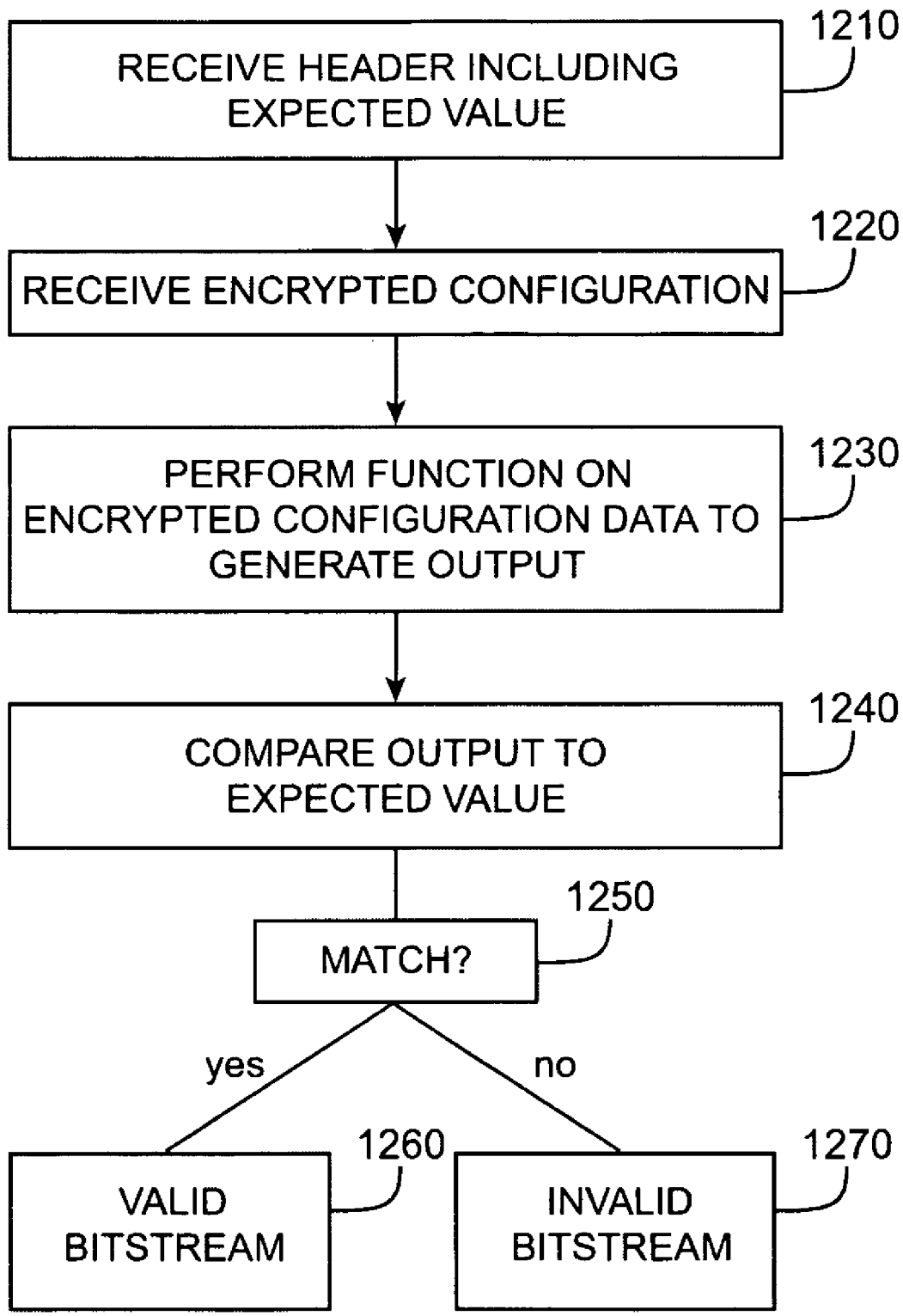
FIG. 12 illustrates a flowchart of a method of verifying a configuration bitstream according to an embodiment of the present invention.

FIG. 12 illustrates a flowchart of a method of verifying a configuration bitstream according to an embodiment of the present invention. In act 1210, a header including an expected value is received. In act 1220, encrypted configuration data is received. The header and encrypted configuration data form an encrypted configuration bitstream.

In act 1230, a function is performed on the encrypted configuration data by a function block in order to generate an output. This output is compared to an expected value in act 1240. In act 1250, it is determined whether the expected value received as part of the header matches the output provided by the function block. If there is a match, the bitstream is valid 1260. If there is not a match, the bitstream is invalid 1270.

Figure 13:
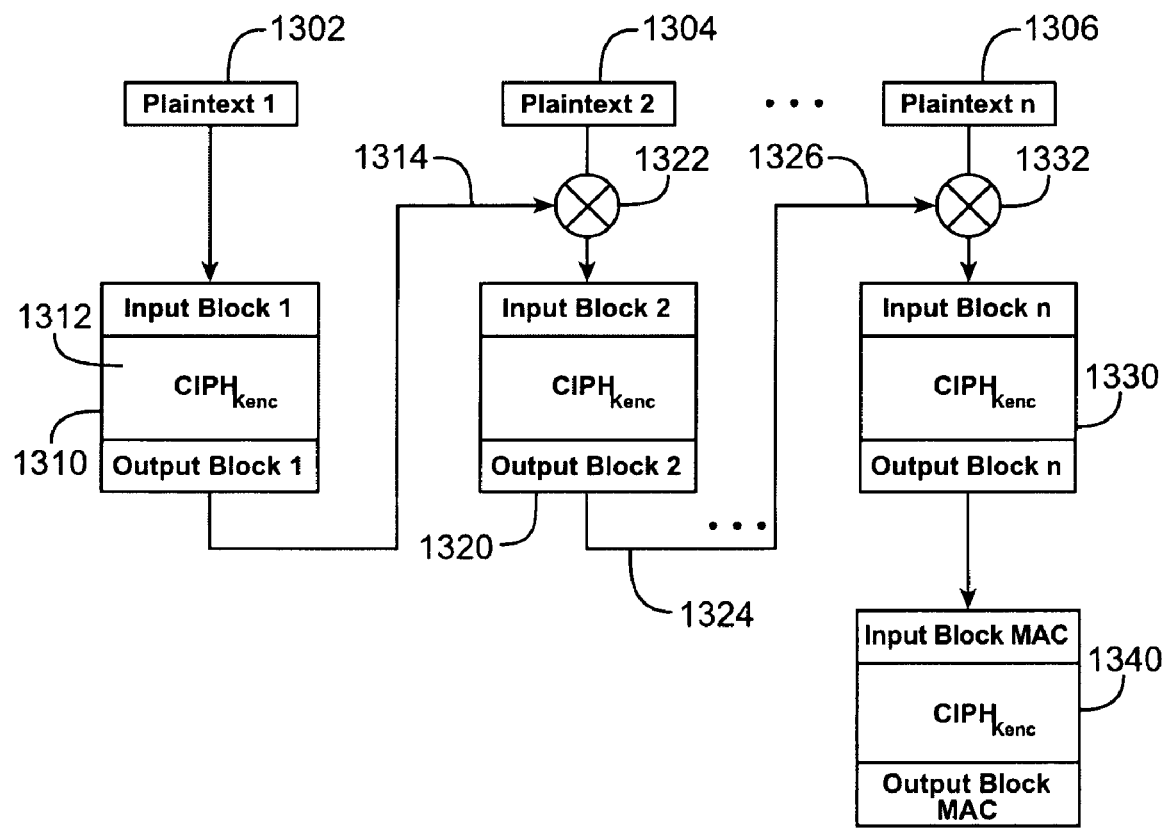
FIG. 13 illustrates a circuit that may be used as the function block in FIG. 11.

FIG. 13 illustrates a circuit that may be used as the function block in FIG. 11. The received configuration data is broken up into plain text portions 1302, 1304, and 1306. The concatenation of these portions result in reassembling the configuration data. The first portion of the configuration data 1302 is encrypted using an encryption key 1312, thus generating an output on line 1314. The output on line 1314 is exclusive-ORed with the second portion of the configuration data 1304 by exclusive-OR circuit 1322. The result on line 1324 passes through a number of similar blocks until reaches a final stage. At this point, the cumulative result on line 1326 is exclusive-ORed with configuration data 1306 by exclusive-OR circuit 1322. The output is encrypted by encryption block 1330 and the result is provided to a final encryption stage 1340. Encryption block 1340 provides an output that may be compared to an expected value that is provided as part of a configuration bitstream header.

In this particular example, the encryption functions 1310, 1320, 1330, and 1340 are shown as separate circuits. In practical integrated circuits, these will be one circuit. Further, this circuit can be shared with the key modification circuits such as 660 in FIG. 6. The encryption key 1312 can be the same key as the modified key 690 also in FIG. 6. Alternately, different functions, circuits, and keys can be used for this function.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of decrypting a configuration bitstream that configures an integrated circuit, the method comprising:
   receiving a first key on the integrated circuit;
   performing a function on the first key a first number of times to generate a second key;
   storing the second key in a memory on the integrated circuit;
   at power up of the integrated circuit, retrieving the second key from the memory;
   subsequent to retrieving the second key, performing the function on the second key a second number of times to generate a third key, wherein the third key is different from the first key; and
   using the third key to decrypt the configuration bitstream.

2. The method of claim 1 wherein the first number is stored on the integrated circuit.

3. The method of claim 1 wherein the first number is received with the first key.

4. The method of claim 3 wherein the first number is stored in a first non-volatile memory.

5. The method of claim 1 wherein the second key is stored in a non-volatile memory on the integrated circuit.

6. The method of claim 1 wherein the first key is provided by a user.

7. The method of claim 1 wherein the function is AES encryption.

8. The method of claim 1 wherein the integrated circuit is a field programmable gate array.

9. The method of claim 1 further comprising:
   receiving the user key;
   performing the function on the key a first number of times followed by a second number of times to generate a fourth key; and
   using the fourth key to encrypt the configuration bitstream.

10. A method of decrypting a configuration bitstream comprising:
    receiving, at a first time, a first key using an integrated circuit;
    performing a function on the first key a first number of times to generate a second key;
    using the second key to set a first number of non-volatile memory locations wherein the first number of non-volatile memory locations configure a decoder circuit;
    receiving, at a second time, the first key using the integrated circuit;
    decoding the first key using the configured decoder circuit to generate a third key;
    performing the function on the third key the first number of times to generate a fourth key;
    storing the fourth key in a second number of non-volatile memory locations; and
    decrypting the configuration bitstream using a fifth key derived from the fourth key.

11. The method of claim 10 further comprising:
    at power up of the integrated circuit, retrieving the fourth key from the second number of non-volatile memory locations;
    performing the function on the fourth key a second number of times to generate the fifth key.

12. The method of claim 11 wherein the first and second number of non-volatile memory locations are fuses.

13. The method of claim 11 wherein the first key is received via a JTAG interface.

14. The method of claim 11 wherein the function is AES encryption.

15. The method of claim 11 wherein the integrated circuit is a field programmable gate array.

16. An integrated circuit that decrypts a configuration bitstream that configures the integrated circuit, the integrated circuit comprising:
    an input for receiving a first key;
    a first circuit that performs a function on the first key a first number of times to generate a second key and that stores the second key in a memory;
    a second circuit that, at power up of the integrated circuit, retrieves the second key from the memory and that performs the function on the second key a second number of times to generate a third key, wherein the third key is different from the first key; and
    a decryption circuit that uses the third key to decrypt the configuration bitstream.

17. The integrated circuit of claim 16 wherein the first number is stored on the integrated circuit.

18. An integrated circuit that decrypts a configuration bitstream that configures the integrated circuit, the integrate circuit comprising:
    an input for receiving a first key a first time;
    a first circuit that performs a function on the first key a first number of times to generate a second key;
    a first number of non-volatile memory locations that are set using the second key;
    a decoding circuit that is configured by the first number of non-volatile memory locations and that decodes the first key using the configured decoder circuit to generate a third key;
    a second circuit that performs a function on the third key the first number of times to generate a fourth key; and
    a second number of non-volatile memory locations that store the fourth key;
    a decryption circuit that uses a fifth key, derived from the fourth key, to decrypt the configuration bitstream.

19. The integrated circuit of claim 18, wherein the second circuit is the first circuit.

20. The integrated circuit of claim 19, further comprising:
    a third circuit that retrieves the third key from the second number of non-volatile memory locations and that performs the function on the fourth key a second number of times to generate the fifth key.

* * * * *

UNITED STATES PATENT AND TRADEMARK OFFICE
CERTIFICATE OF CORRECTION

PATENT NO. : 7,606,362 B1  Page 1 of 1
APPLICATION NO. : 11/042019
DATED : October 20, 2009
INVENTOR(S) : Streicher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1185 days.

Signed and Sealed this

Fourteenth Day of December, 2010

David J. Kappos
*Director of the United States Patent and Trademark Office*